(12) United States Patent
Taniguchi et al.

(10) Patent No.: US 10,170,954 B2
(45) Date of Patent: Jan. 1, 2019

(54) DIRECT CURRENT MOTOR

(71) Applicant: Hitachi Automotive Systems, Ltd., Hitachinaka-shi, Ibaraki (JP)

(72) Inventors: Tsukasa Taniguchi, Hitachinaka (JP); Hidefumi Iwaki, Hitachinaka (JP); Koichi Kashiwa, Hitachinaka (JP); Masahiro Hosoya, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 179 days.

(21) Appl. No.: 15/117,335

(22) PCT Filed: Jan. 14, 2015

(86) PCT No.: PCT/JP2015/050705
§ 371 (c)(1),
(2) Date: Aug. 8, 2016

(87) PCT Pub. No.: WO2015/122226
PCT Pub. Date: Aug. 20, 2015

(65) Prior Publication Data
US 2016/0352171 A1 Dec. 1, 2016

(30) Foreign Application Priority Data
Feb. 17, 2014 (JP) .................. 2014-027190

(51) Int. Cl.
*H02K 3/28* (2006.01)
*H02K 23/28* (2006.01)
(Continued)

(52) U.S. Cl.
CPC ............ *H02K 3/28* (2013.01); *H02K 1/26* (2013.01); *H02K 3/12* (2013.01); *H02K 23/28* (2013.01); *H02K 23/30* (2013.01); *H02K 23/32* (2013.01)

(58) Field of Classification Search
CPC .......... H02K 23/30; H02K 1/26; H02K 23/28; H02K 23/32; H02K 3/12; H02K 3/28
(Continued)

(56) References Cited

U.S. PATENT DOCUMENTS 3,705,459 A * 12/1972 Biddison .............. H02K 13/04
242/433.3
3,818,257 A * 6/1974 Porter .................. H02K 23/26
310/179

(Continued)

FOREIGN PATENT DOCUMENTS

JP 61-231853 A 10/1986
JP 6-14486 A 1/1994
(Continued)

OTHER PUBLICATIONS

Translation of foreign document JP 2009213258 A (Year: 2009).*
(Continued)

*Primary Examiner* — Alex W Mok
(74) *Attorney, Agent, or Firm* — Crowell & Moring LLP

(57) ABSTRACT

The purpose of the present invention is to provide a direct current motor wherein the number of coil-connecting wires that cross the outer surface of a coil end part is reduced. In a direct current motor that is provided with an armature that has a plurality of armature slots and has an armature coil that is wound so as to span two armature slots that are separated by a fixed number of armature slots, a lowermost layer of a coil end part is provided with at least four armature coils that are wound through other armature slots so as not to coincide with the wound armature coil, and a layer above the four armature coils that are wound on the bottommost layer is provided with at least four armature coils that are wound in the same manner as the four armature coils.

7 Claims, 10 Drawing Sheets

(51) Int. Cl.
*H02K 23/32* (2006.01)
*H02K 3/12* (2006.01)
*H02K 1/26* (2006.01)
*H02K 23/30* (2006.01)

(58) Field of Classification Search
USPC .......................................................... 310/177
See application file for complete search history.

(56) References Cited

U.S. PATENT DOCUMENTS

| | | | | |
|---|---|---|---|---|
| 3,913,220 A | * | 10/1975 | Miller | H02K 15/09 |
| | | | | 242/433 |
| 4,271,380 A | * | 6/1981 | Bradler | D06F 37/304 |
| | | | | 310/133 |
| 4,292,559 A | * | 9/1981 | Auinger | D06F 37/304 |
| | | | | 310/112 |
| 4,329,610 A | * | 5/1982 | Klein | H02K 23/30 |
| | | | | 310/198 |
| 4,417,388 A | * | 11/1983 | Major | H02K 23/26 |
| | | | | 29/598 |
| 4,598,222 A | * | 7/1986 | Matsunaga | H02K 23/32 |
| | | | | 310/198 |
| 4,616,788 A | * | 10/1986 | Finegold | H02K 15/085 |
| | | | | 242/433.3 |
| 5,407,142 A | | 4/1995 | Trevisan | |

FOREIGN PATENT DOCUMENTS

| | | |
|---|---|---|
| JP | 10-285854 A | 10/1998 |
| JP | 2009-213258 A | 9/2009 |

OTHER PUBLICATIONS

Translation of foreign document JP 61231853 A (Year: 1986).*
International Search Report (PCT/ISA/210) issued in PCT Application No. PCT/JP2015/050705 dated Apr. 14, 2015 with English translation (Two (2) pages).
Japanese-language Written Opinion (PCT/ISA/237) issued in PCT Application No. PCT/JP2015/050705 dated Apr. 14, 2015 (Three (3) pages).

* cited by examiner

DIRECT CURRENT MOTOR

TECHNICAL FIELD

The present invention relates to a structure of an armature coil of a direct-current motor and more specifically relates to a direct-current motor suitable for use as a car electric component.

BACKGROUND ART

Conventionally, as a wire winding method for a rotor of a direct-current motor, a technique described in JP 10-285854 A (PTL 1) is known.

A direct-current motor in PTL 1 includes an armature core (armature) having a rotating shaft outer circumferential portion provided at a center thereof with a through hole fitted to a rotating shaft and multiple approximately-T-shaped magnetic pole portions formed in a radial direction from this rotating shaft outer circumferential portion (paragraph 0012). In this armature core, slots are formed between the adjacent approximately-T-shaped magnetic pole portions to constitute multiple slots in a circumferential direction (paragraph 0013).

PTL 1 also discloses the following configuration (paragraphs 0013 to 0020).

The armature core has a four-pole thirteen-slot configuration, and armature coils are wound by means of wave winding. Specifically, each coil is wound to interpose two slots between the approximately-T-shaped magnetic pole portions arranged on both sides of the two slots in the circumferential direction to stride over the approximately-T-shaped magnetic pole portions. That is, each coil is wound to stride over an arbitrary slot (first slot) and a second slot located at a position reached by skipping two slots from the first slot. The number of armature coils is thirteen, and relationship between respective armature coils C1 to C13 and slots S1 to S13 through which the coils are wound is as follows. The first armature coil C1 is wound to stride over the slots S1 and S4, the second armature coil C2 is wound to stride over the slots S7 and S10, the third armature coil C3 is wound to stride over the slots S13 and S3, the fourth armature coil C4 is wound to stride over the slots S6 and S9, the fifth armature coil C5 is wound to stride over the slots S12 and S2, the sixth armature coil C6 is wound to stride over the slots S5 and S8, the seventh armature coil C7 is wound to stride over the slots S11 and S1, the eighth armature coil C8 is wound to stride over the slots S4 and S7, the ninth armature coil C9 is wound to stride over the slots S10 and S13, the tenth armature coil C10 is wound to stride over the slots S3 and S6, the eleventh armature coil C11 is wound to stride over the slots S9 and S12, the twelfth armature coil C12 is wound to stride over the slots S2 and S5, and the thirteenth armature coil C13 is wound to stride over the slots S8 and S11.

CITATION LIST

Patent Literature

PTL 1: JP 10-285854 A

SUMMARY OF INVENTION

Technical Problem

In the conventional technique including PTL 1, since the wave winding, in which the armature coils (hereinbelow referred to as coils) adjacent to each other in the circumferential direction are sequentially wound to partially overlap with each other at coil end portions thereof, is employed, the number of times of overlap of coils increases as a wire winding process proceeds, and the coil end portions tend to be large.

In the conventional wire winding method by means of the wave winding, many coil connecting wires connecting the coils to a commutator go across outer surfaces of the coil end portions at which the plurality of coils highly overlap although this is not described in PTL 1. Such coil connecting wires go across the coil end portions to be exposed to an upper side of the wound coils at the highest parts in the coil end portions at which the plurality of coils overlap. For example, in the case of the direct-current motor in PTL 1 having the four-pole thirteen-slot configuration, such coil connecting wires exist at seven locations of the coil end portions.

In the wire winding process for the motor, each of the coil end portions is subject to pressure forming after coil winding to reduce a dimension of the coil end portion in an axial direction to a predetermined dimension. At the time of this pressure forming, application of improper forming load to the coil connecting wire may cause disconnection and an insulation failure. Thus, the forming load needs to be applied to the coil end portion while avoiding the coil connecting wire going across the outer surface of the coil end portion, or a value of the forming load needs to be set to be low so that the forming load to be applied to the coil connecting wire going across the outer surface of the coil end portion may not be too large. However, in a case in which the number of the coil connecting wires going across the outer surfaces of the coil end portions increases, it is difficult to apply the forming load to each of the coil end portions while avoiding these coil connecting wires. Also, setting the value of the forming load to be low makes it difficult to reduce the dimension of the coil end portion to a predetermined dimension.

An object of the present invention is to provide a direct-current motor in which the number of coil connecting wires going across an outer surface of a coil end portion is decreased.

Solution to Problem

In order to solve the above issue, a direct-current motor of the present invention includes an armature including a plurality of armature slots and an armature coil wound to stride over two of the armature slots away from each other with a certain number of the armature slots interposed therebetween, and includes at least four armature coils each wound on a lowermost layer of a coil end portion without overlapping with the armature coil wound through the different armature slots, wherein, on a higher layer than the four armature coils wound on the lowermost layer, at least four armature coils wound in an equal pattern to that of the four armature coils are provided.

Advantageous Effects of Invention

The number of inter-coil overlaps at the coil end portions of the armature coils can be reduced, and the number of coil connecting wires going across the highest overlapping parts of the armature coils can be low.

Other problems, configurations, and effects than the above are made clear in the following description of embodiments.

DESCRIPTION OF EMBODIMENTS

Figure 1:
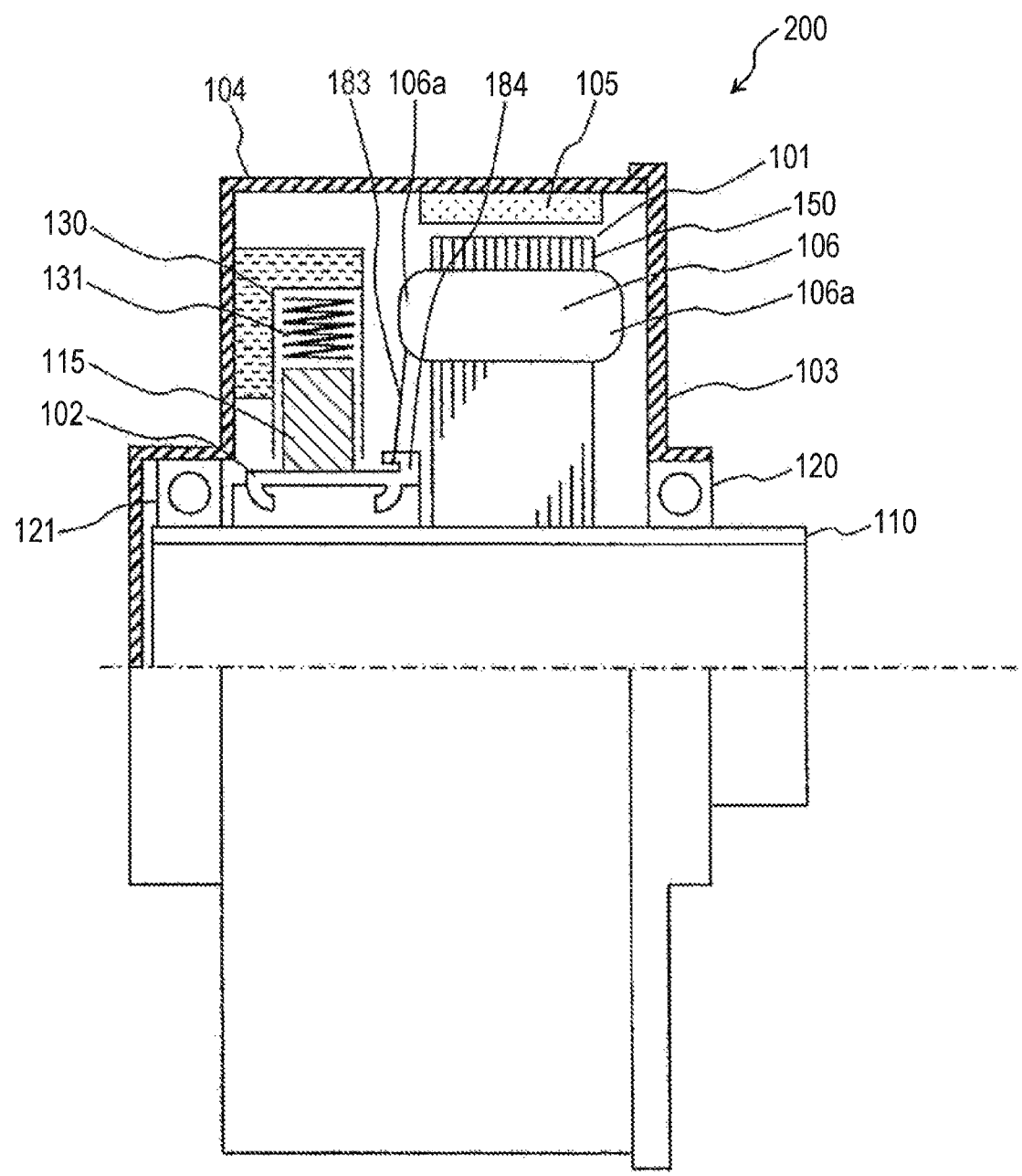
FIG. 1 is a cross-sectional view of a direct-current motor according to Embodiment 1 of the present invention viewed from a side surface.

In embodiments according to the present invention, in a multilayer-wave-winding direct-current motor including a yoke 104, a field magnet 105 arranged on an inner circumferential side of the yoke 104, an armature 101 rotatably supported to have a space on an inner circumferential side of the field magnet 105, a shaft 110 arranged on a center axis of the armature 101, a commutator 102 arranged in a circumferential direction of the shaft 110, a plurality of armature slots 171 arranged on an outer circumference of an armature core 150, and armature coils 106 as a plurality of coils each wound through two armature slots 171 away from each other with a certain number of armature slots 171 interposed therebetween, and winding coil connecting wires 188 via commutator segments 182, the plurality of coils 106 wound at least in one layer are wound so that the coils 106 may not overlap with each other at coil end portions 106a, and so that an armature slot 171 housing a winding conductor (coil side 106b), starting winding, of a coil 106 and an armature slot 171 housing a winding conductor (coil side 106b), ending winding, of another coil 106 may correspond, or so that an armature slot 171 housing a winding conductor (coil side 106b), ending winding, of a coil 106 and an armature slot 171 housing a winding conductor (coil side 106b), starting winding, of another coil 106 may correspond.

Meanwhile, although the plurality of coils 106 wound in one layer are wound through the armature slots 171 without overlapping with each other, in Embodiment 3 described below, only one overlapping part is generated between two coils.

Figure 10:
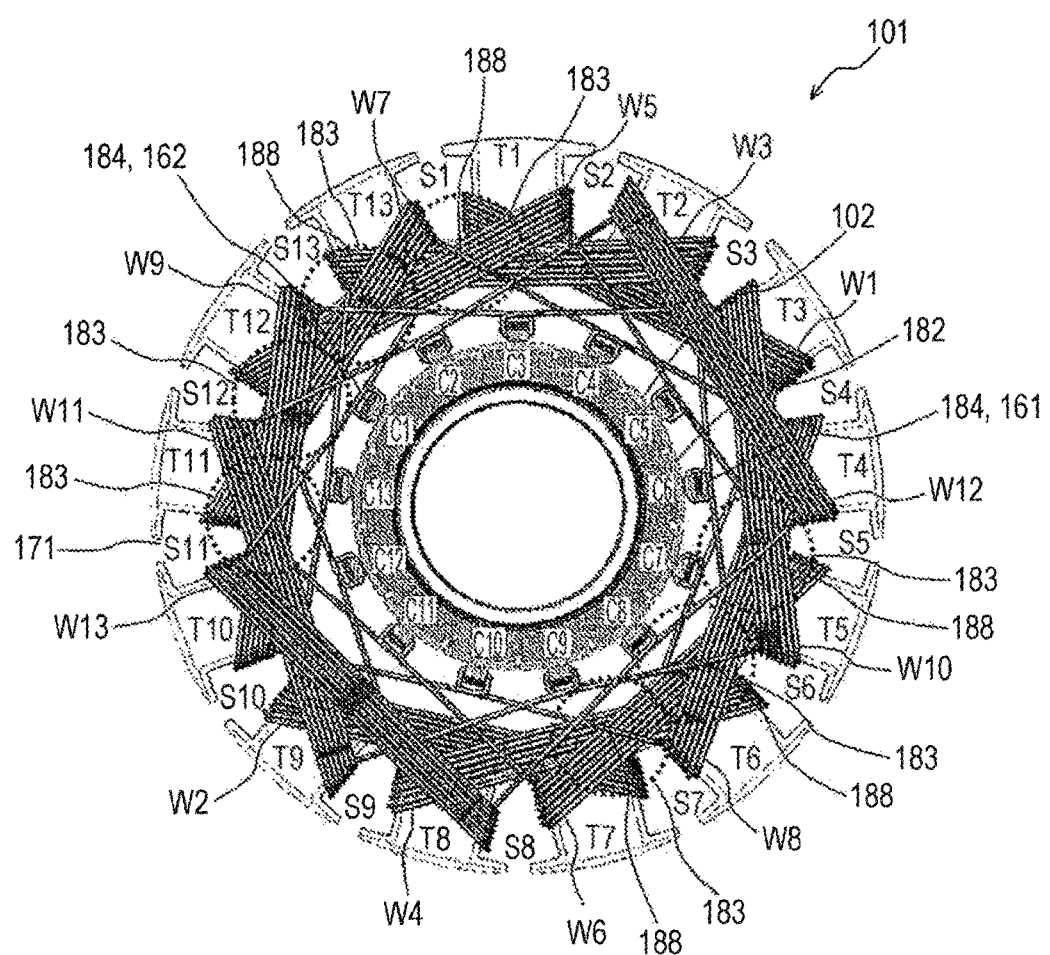
FIG. 10 illustrates an armature of the direct-current motor as the comparative example viewed from a commutator side.

To facilitate understanding of characteristics of a wire winding method in a direct-current motor according to the present invention, a direct-current motor as a comparative example will be described with reference to FIGS. 9A to 9D and 10. FIGS. 9A to 9D describe wire winding in a direct-current motor as a comparative example with the present invention. FIG. 10 illustrates an armature of the direct-current motor as the comparative example viewed from a commutator side.

In this comparative example, as for wave winding, which is a wire winding method for an armature of a direct-current motor, an overview of winding and a state of the armature after winding will be described, taking retrogressive winding of wave winding for a four-pole thirteen-slot armature as an example.

In the following description, an armature coil (coil), an armature slot, and a commutator segments are referred to as an armature coil (coil) Wn, an armature slot Sn, and a commutator segment Cn (where n=1, 2, 3 . . . 13) in a case in which the positions thereof need to be specified and are referred to as an armature coil (coil) 106, an armature slot 171, and a commutator segment 182 in a case in which the positions thereof do not need to be specified.

An overview of winding will be described with reference to FIGS. 9A to 9D. Winding starts with a commutator segment No. S1, and thirteen coils are sequentially wound through predetermined armature slots under a condition in which a slot pitch is 3, and in which a segment pitch is 6. Under this condition, after a coil W1 and a coil W2 have been wound, a coil W3 and a coil W4 are wound through armature slots 171 housing coil sides located one slot away from the coil W1 and the coil W2 in the away direction. At this time, the coil W3 and the coil W4 are wound to overlap with the coil W1 and the coil W2 at coil end portions thereof, respectively. Subsequently, a coil W5 and a coil W6, a coil W7 and a coil W8, a coil W9 and a coil W10, and a coil W11 and a coil W12 are sequentially wound in a similar manner, and a coil W13 is finally wound. The coil is wound with one stroke while coil connecting wires are hung on commutator segments each formed in a hook shape, and winding ends at the commutator segment No. C1.

A double connecting portion 162, which two winding conductors are hung on, is only the commutator segment No. C1, and the other commutator segments are single connecting portions 161, each of which one winding conductor is hung on. Also, since the coils are continuously wound with coil connecting wires 188 interposed therebetween, time required for winding is as long as time for a wire winding process of thirteen coils.

Also, as in the state after winding of the armature coils in FIG. 10, the number of coil connecting wires going across outer surfaces of the coils out of the coil connecting wires 188 each connecting between the coils via a commutator segment 182 is seven at the end of winding. In FIG. 10, locations (parts) at which these seven coil connecting wires 188 go across the outer surfaces of the coils are shown with dotted line circles 183.

The location 183 at which the coil connecting wire 188 goes across the outer surface of the coil is a location at which the coil connecting wire goes across a coil end portion 106a to be exposed to an upper side of overlapping coils 106 at the highest part in the coil end portion 106a at which the plurality of coils 106 overlap. For example, the coil connecting wire 188 connected from the coil W7 to a commutator segment No. C4 goes across an upper portion of a part at which the coil W5 and the coil W3 are piled. At this time, the coil W1 resides under a piled part of the coil W5 and the coil W3 at a position close to the piled part of the coil W5 and the coil W3. Thus, the coil connecting wire 188 connected from the coil W7 to a commutator segment No. C4 substantially goes across an upper portion of a part at which the three coils 106 consisting of the coil W5, the coil W3, and the coil W1 are piled. A thickness (height) dimension of the part at which the three coils are piled is the longest thickness (height) dimension in the coil end 106a.

Meanwhile, in FIG. 10, the number of each commutator segment is referred to as Cn (n=1, 2, ..., 13), the number of each slot housing the coil sides is referred to as Sn (n=1, 2, ..., 13), and the number of each tooth which the coils are wound around is referred to as Tn (n=1, 2, ..., 13). It is to be noted that "n" corresponds to the number of slots (the number of teeth), and that, when the number of slots (the number of teeth) changes, "n" changes to correspond to it. The same is true of FIG. 5 described below.

In recent years, for improvement of fuel efficiency of cars, the number of car electric component motors mounted per car tends to increase. For this reason, there is raised an increasing demand for improving motor mounting capability by achieving a small-sized and lightweight motor and improving motor reliability by achieving a highly-reliable motor.

In the wire winding method in the aforementioned comparative example and PTL 1, wave winding, in which the coils adjacent to each other in the circumferential direction are sequentially wound to partially overlap with each other at the coil end portions 106a thereof, is employed. Accordingly, the number of times of overlap of the coils 106 increases as the wire winding process proceeds, and the coil end portions 106a tend to be large.

Also, in a case in which many coil connecting wires 188 connecting the coils 106 to a commutator 102 go across the outer surfaces of the coils, the coil connecting wires 188 may slightly change in position or vibrate since the coil connecting wires 188 are not fixed by the coils 106. In a case in which the coil connecting wires 188 contact with other parts or are in friction with the coils 106 due to vibration, disconnection and an insulation failure may occur. A motor to be mounted on a car needs to have a structure resistant to vibration. In a case in which the coil end portions 106a are enlarged to improve reliability thereof, the volume of the motor will increase, and mounting capability on the car will be poor. With a wire winding method for a direct-current motor according to the present invention, it is possible to provide a direct-current motor reducing the number of coil connecting wires going across an outer surface of a coil and excellent in size reduction (mounting capability) and reliability.

Embodiment 1

Figure 2:
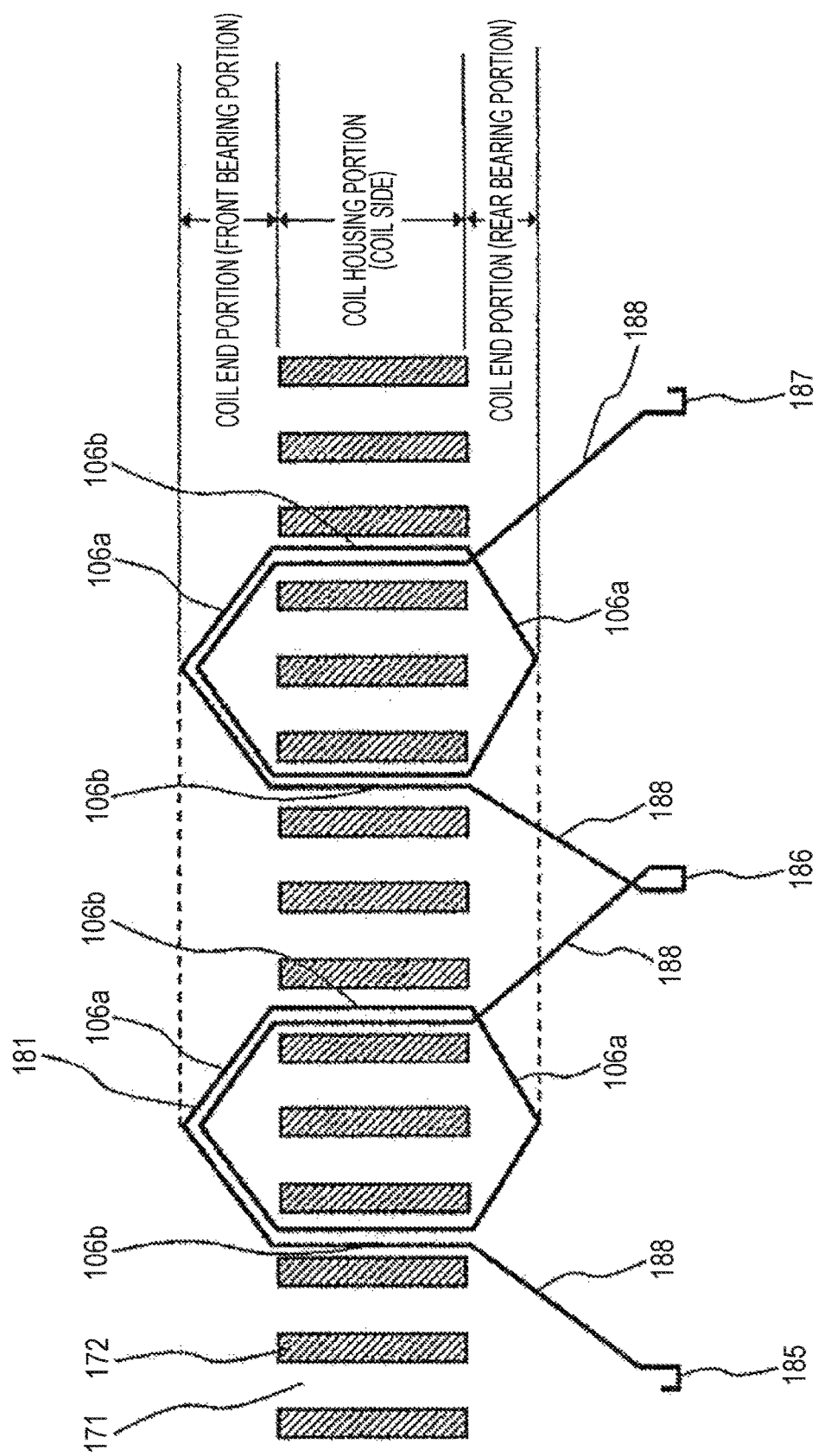
FIG. 2 illustrates a coil group consisting of two coils and a state of winding through armature slots according to Embodiment 1.
Figure 5:
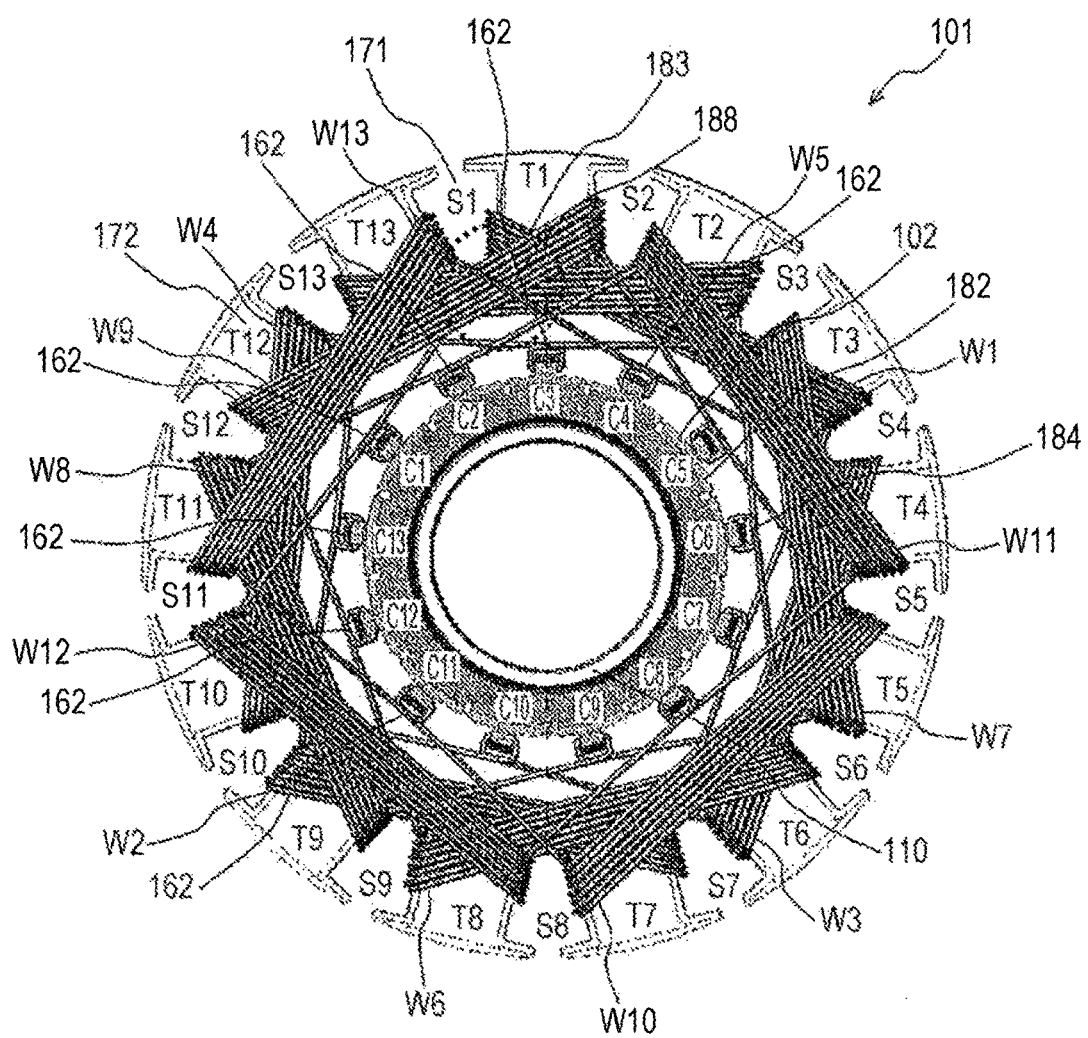
FIG. 5 illustrates the armature of the direct-current motor according to the present embodiment viewed from a commutator side.
Figure 6:
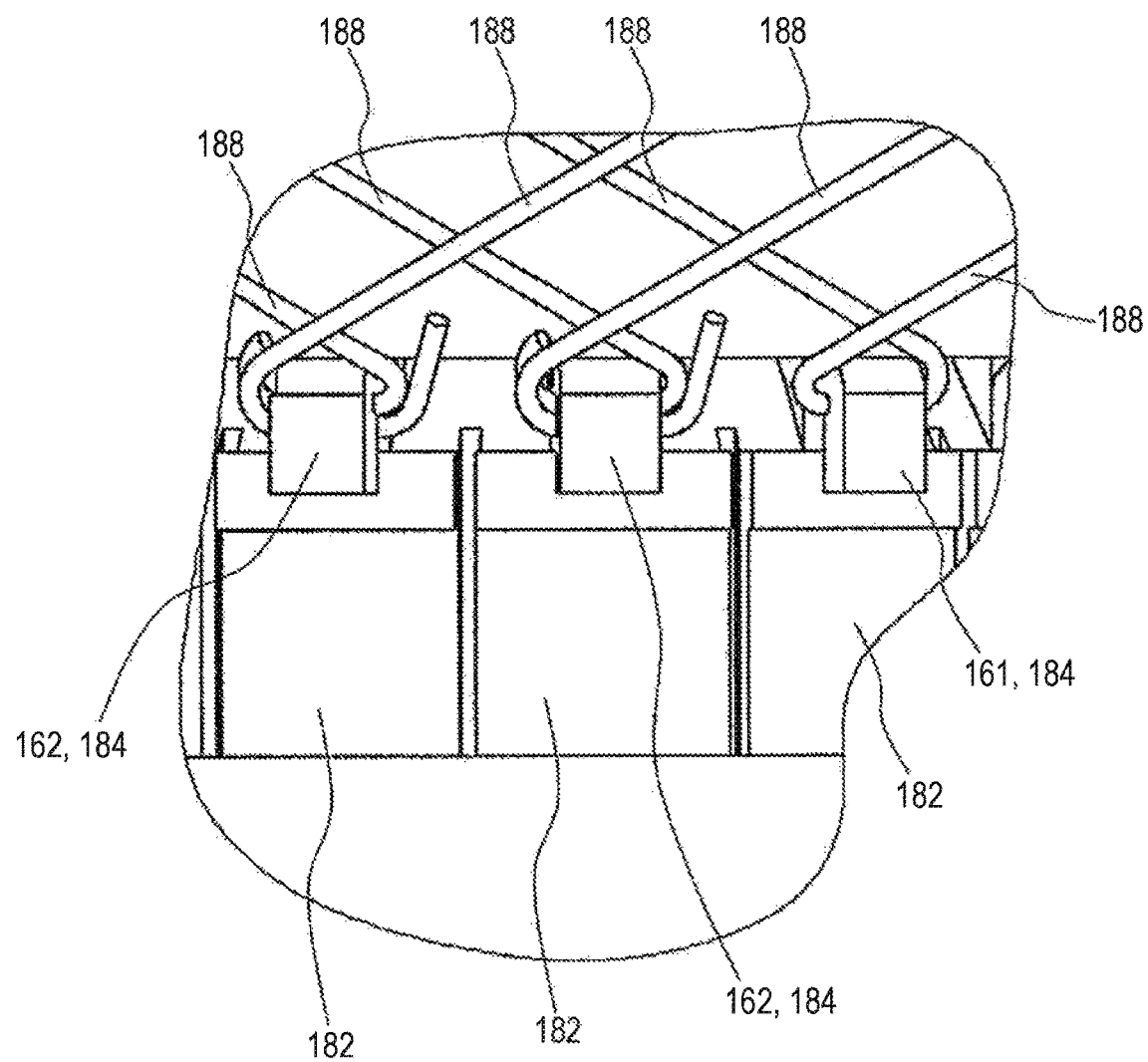
FIG. 6 is an enlarged view illustrating a retaining state of coil connecting wires in conductor retaining portions.

Hereinbelow, Embodiment 1 according to the present invention will be described with reference to FIGS. 1 to 8. FIG. 1 is a cross-sectional view of a direct-current motor according to the present embodiment viewed from a side surface. FIG. 2 illustrates a coil group consisting of two coils and a state of winding through armature slots according to the present embodiment. FIGS. 3(a) to 3(d) describe the winding state according to the present embodiment. FIGS. 4(a) to 4(d) are external views illustrating the state of winding around an armature according to the present embodiment. FIG. 5 illustrates the armature of the direct-current motor according to the present embodiment viewed from a commutator side. FIG. 6 is an enlarged view illustrating a retaining state of coil connecting wires in conductor retaining portions.

The direct-current motor according to the present invention is suitable for use especially as a motor used as a driving source of a car electric component, such as a motor used for control of a valve of an engine and a motor used for driving of a hydraulic pump.

First, a configuration of the direct-current motor will be described with reference to FIG. 1.

A direct-current motor 200 includes a yoke 104, a front bracket 103, a field magnet 105, and an armature 101 (rotor). The yoke 104 is formed approximately in a bottomed cylindrical shape and includes a rear bearing 121 and a brush holder 130. The rear bearing 121 is arranged at a center portion of an end surface of the yoke 104 and rotatably supports one end of a shaft 110.

The front bracket 103 is formed approximately in a disk shape and includes a front bearing 120. The front bracket 103 is arranged at an end portion of the yoke 104. The brush holder 130 holds a brush 115. The brush 115 is biased toward a commutator 102 by a brush pressurizing spring 131 so that power feeding by means of mechanical sliding contact with the commutator 102 may be performed in a stable manner even during rotation. When current along with a commutating action flows into an armature coil 106, continuous rotating torque is generated by interaction between a magnetic field produced by the field magnet 105 and a magnetic field produced by the armature 101, and a mechanical output can be obtained. In the following description, the armature coil 106 is simply referred to as the coil in some cases.

Next, a wire winding structure of the armature of the direct-current motor 200 according to Embodiment 1 of the present invention will be described with reference to FIGS. 2 to 6. In the present embodiment, the wire winding structure will be described, taking retrogressive winding (open winding) of wave winding for a four-pole thirteen-slot armature as an example.

FIG. 2 illustrates one coil group consisting of two coils (number of pole pairs P: 2) electrically connected to commutator segments by means of an equal continuous wire to winding conductors and a state of winding through armature slots 171. In the present description, such a winding method or a winding state is referred to as two-continuous winding.

Also, in FIG. 2, a case in which the number of times of coil winding is two will be described as an example. The number of times of winding being two means twice winding through the armature slots, that is, a state in which two outbound winding conductors and two inbound winding conductors, four winding conductors in total, are housed in the armature slots away from each other, respectively, per coil.

The wire of the coil group consisting of two coils starts winding at a coil end winding start portion 185 retained in a conductor retaining portion 184, is wound a predetermined number of times of winding as a first coil, passes via an inter-coil hairpin portion 186 retained in the conductor retaining portion 184, is wound a predetermined number of times of winding as a second coil, and ends winding at a coil end winding end portion 187 retained in the conductor retaining portion 184.

Figure 3A:
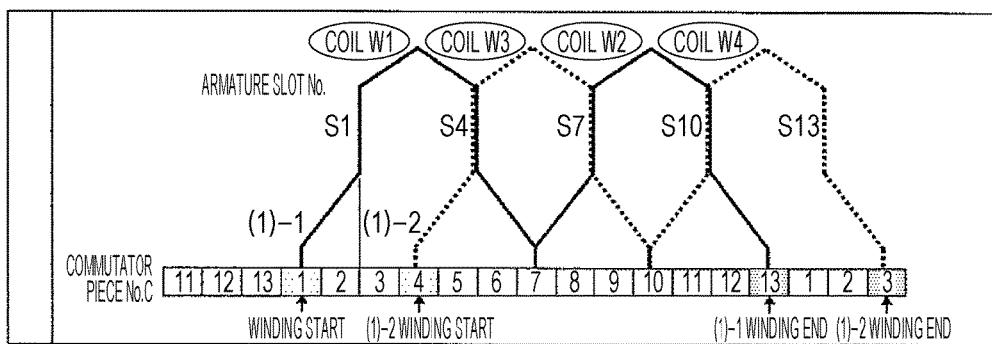
FIGS. 3A to 3D describe the winding state according to Embodiment 1.
Figure 3B:
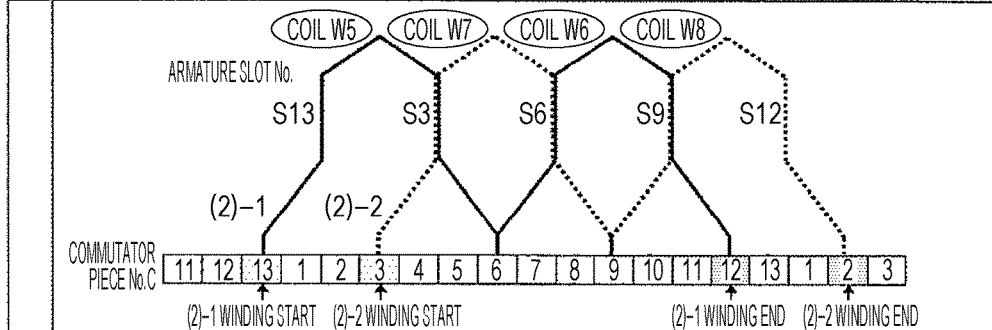
Figure 3C:
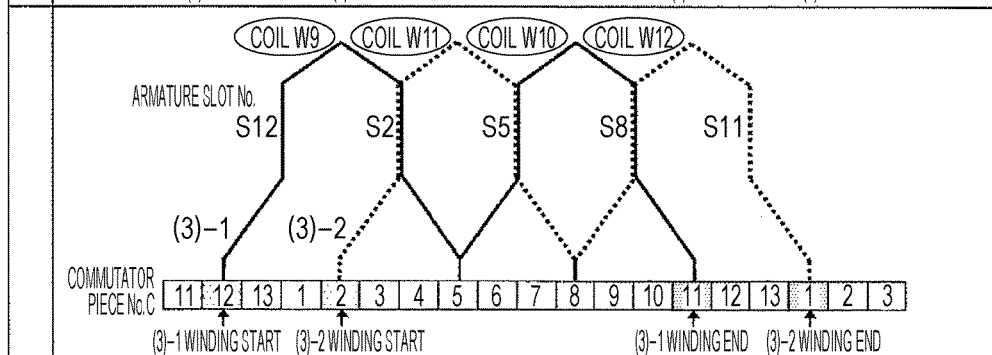
Figure 3D:
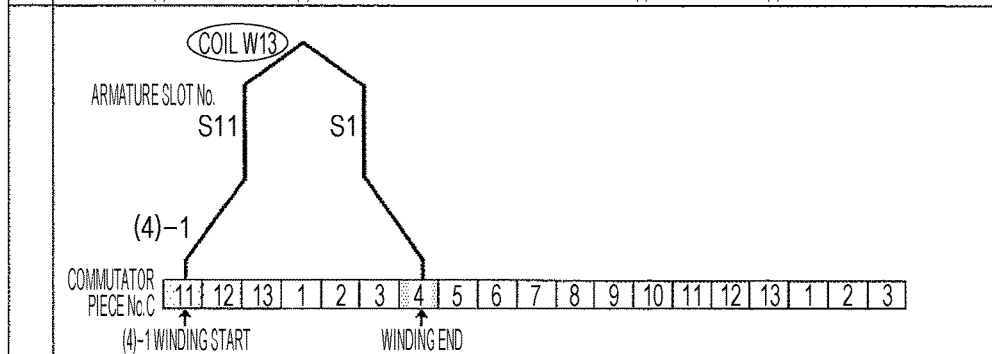

Next, a specific wire winding process will be described. FIGS. 3(a) to 3(d) illustrate a winding state according to Embodiment 1. FIG. 3(a) illustrates a winding state of a first layer, FIG. 3(b) illustrates a winding state of a second layer, FIG. 3(c) illustrates a winding state of a third layer, and FIG. 3(d) illustrates a winding state of a fourth layer. Also, FIGS. 4(a) to 4(d) illustrate external views of the armature corresponding to the respective winding states in FIGS. 3(a) to 3(d).

There are two kinds of coil groups. There are seven coil groups in total, consisting of six coil groups belonging to a first kind each including two coils which get the same number as the number of pole pairs P [Ns/P=13/2=6.5, which becomes 6 after the value is cut off at the first decimal place] and one coil group belonging to a second kind including one coil [(P−1)=2−1=1], where Ns is the number of slots, and P is the number of pole pairs.

Each of these coil groups 181 consists of the coils 106. The number of coils is thirteen. Specifically, a coil group (1)-1 consists of a coil W1 and a coil W2, a coil group (1)-2 consists of a coil W3 and a coil W4, a coil group (2)-1 consists of a coil W5 and a coil W6, a coil group (2)-2 consists of a coil W7 and a coil W8, a coil group (3)-1 consists of a coil W9 and a coil W10, a coil group (3)-2 consists of a coil W11 and a coil W12, and a coil group (4)-1 consists of a coil W13.

Description will be provided in order of winding of the respective coils and coil groups. It is to be noted that FIGS. 3(a) to 3(d) illustrate a simplified winding state in which each coil 106 is wound through any of the armature slots 171 (S1 to S13) once, not a state in which each coil 106 is wound through any of the armature slots 171 plural times. Also, the coils and the coil groups are provided with numbers in accordance with the winding order, and the coils are wound in order of the coil W1, the coil W2, . . . , and the coil W13, and the coil groups are wound in order of the coil group (1)-1, the coil group (1)-2, the coil group (2)-1, . . . , and the coil group (4)-1.

Figure 4A:
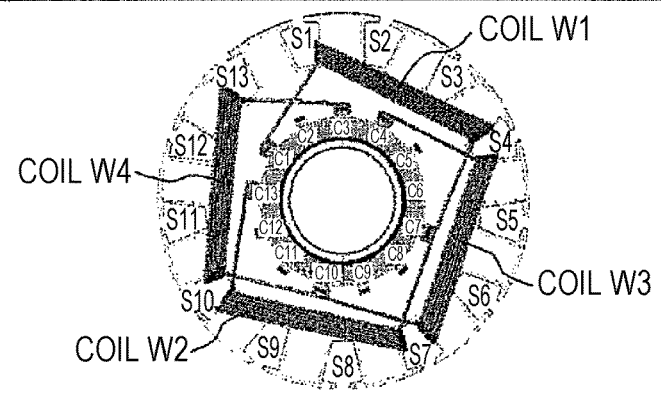
FIGS. 4A to 4D are external views illustrating the state of winding around an armature according to Embodiment 1.
Figure 4B:
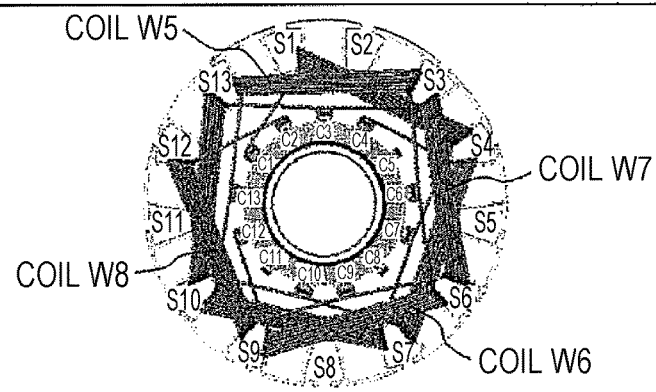
Figure 4C:
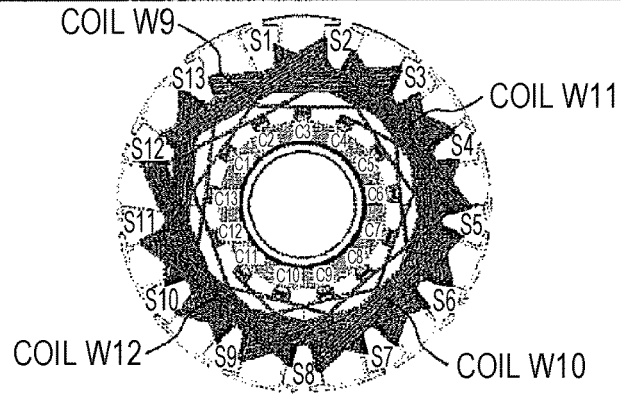
Figure 4D:
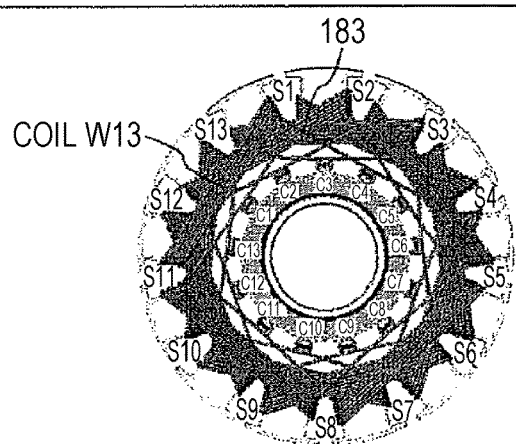

As for FIGS. 3(a) to 3(d) and 4(a) to 4(d), FIGS. 3(a) and 4(a) illustrate a winding wire connecting diagram of the coil group (1)-1 and the coil group (1)-2 constituting the first layer and the external view of the armature after winding of the first layer, FIGS. 3(b) and 4(b) illustrate a winding wire connecting diagram of the coil group (2)-1 and the coil group (2)-2 constituting the second layer and the external view of the armature after winding of the second layer, FIGS. 3(c) and 4(c) illustrate a winding wire connecting diagram of the coil group (3)-1 and the coil group (3)-2 constituting the third layer and the external view of the armature after winding of the third layer, and FIGS. 3(d) and 4(d) illustrate a winding wire connecting diagram of the coil group (4)-1 constituting the fourth layer and the external view of the armature after winding of the fourth layer.

First, a wire winding configuration of the coil group (1)-1 and the coil group (1)-2 will be described with reference to FIGS. 3(a) and 4(a).

In the coil group (1)-1, winding starts with a commutator segment No. C1. The coil end winding start portion 185 of the coil W1 serving as a component of the coil group (1)-1 is hung on the commutator segment No. C1, and the coil W1 is wound around a part ranging from an armature slot No. S1 to an armature slot No. S4. Subsequently, the inter-coil hairpin portion is hung on a commutator segment No. C7, and the coil W2 is wound around a part ranging from an armature slot No. S7 to an armature slot No. S10. The coil end winding end portion 187 is hung on a commutator segment No. C13 to end winding of the coil group (1)-1. In the coil W1 and the coil W2 of the coil group (1)-1, one winding conductor is continuously wound without being disconnected in the middle. The coil group (1)-1 consists of the coil W1 and the coil W2 in which one winding conductor is wound by means of the two-continuous winding.

In the coil group (1)-2, winding starts with a commutator segment No. C4. The coil end winding start portion 185 of the coil W3 serving as a component of the coil group (1)-2 is hung on the commutator segment No. C4, and the coil W3 is wound around a part ranging from the armature slot No. S4 to the armature slot No. S7. Subsequently, the inter-coil hairpin portion is hung on a commutator segment No. C10, and the coil W4 is wound around a part ranging from the armature slot No. S10 to an armature slot No. S13. The coil end winding end portion 187 is hung on a commutator segment No. C3 to end winding of the coil group (1)-2. In the coil W3 and the coil W4 of the coil group (1)-2, one winding conductor is continuously wound without being disconnected in the middle. The coil group (1)-2 consists of the coil W3 and the coil W4 in which one winding conductor is wound by means of the two-continuous winding.

Since the different coils share the equal slots housing coil sides at the armature slots No. S4, No. S7, and No. S10, the coils constituting the first layer can be distributed and wound so as not to overlap with each other as illustrated in FIG. 4(a). That is, this first layer is provided with the first to fourth armature coils 106 (W1 to W4) wound on a lowermost layer without overlapping with the armature coils 106 wound through the different armature slots and sequentially arranged to be adjacent to each other. The first to fourth armature coils 106 (W1 to W4) have the coil sides adjacent to each other housed in the equal armature slots 171 (S4, S7, and S10).

Next, wire winding of the coil groups (2)-1 and (2)-2 in the second layer will be described with reference to FIGS. 3(b) and 4(b).

In the coil group (2)-1, winding starts with the commutator segment No. C13. The coil end winding start portion 185 of the coil W5 serving as a component of the coil group (2)-1 is hung on the commutator segment No. C13, and the coil W5 is wound around a part ranging from the armature slot No. S13 to an armature slot No. S3. Subsequently, the inter-coil hairpin portion is hung on a commutator segment No. C6, and the coil W6 is wound around a part ranging from an armature slot No. S6 to an armature slot No. S9. The coil end winding end portion 187 is hung on a commutator segment No. C12 to end winding of the coil group (2)-1. In the coil W5 and the coil W6 of the coil group (2)-1, one winding conductor is continuously wound without being disconnected in the middle. The coil group (2)-1 consists of the coil W5 and the coil W6 in which one winding conductor is wound by means of the two-continuous winding.

In the coil group (2)-2, winding starts with the commutator segment No. C3. The coil end winding start portion 185 of the coil W7 serving as a component of the coil group (2)-2 is hung on the commutator segment No. C3, and the coil W7 is wound around a part ranging from the armature slot No. S3 to the armature slot No. S6. Subsequently, the inter-coil hairpin portion is hung on a commutator segment No. C9, and the coil W8 is wound around a part ranging from the armature slot No. S9 to an armature slot No. S12. The coil end winding end portion 187 is hung on a commutator segment No. C2 to end winding of the coil group (1)-2. In the coil W7 and the coil W8 of the coil group (2)-2, one winding conductor is continuously wound without being disconnected in the middle. The coil group (2)-2 consists of the coil W7 and the coil W8 in which one winding conductor is wound by means of the two-continuous winding.

Since the different coils share the equal slots housing the coil sides at the armature slots No. S3, No. S6, and No. S9, the coils constituting the second layer can be distributed and wound so as not to overlap with each other as illustrated in FIG. 4(b).

The second layer is provided with the plurality of armature coils W5 to W8 wound, at the equal slot pitch: 3 to that of the first to fourth armature coils W1 to W4, on the armature coils W1 to W4 wound in the lowermost layer (first layer).

Next, wire winding of the coil groups (3)-1 and (3)-2 in the third layer will be described with reference to FIGS. 3(c) and 4(c).

In the coil group (3)-1, winding starts with the commutator segment No. C12. The coil end winding start portion 185 of the coil W9 serving as a component of the coil group (3)-1 is hung on the commutator segment No. C12, and the coil W9 is wound around a part ranging from the armature slot No. S12 to an armature slot No. S2. Subsequently, the inter-coil hairpin portion is hung on a commutator segment No. C5, and the coil W10 is wound around a part ranging from an armature slot No. S5 to an armature slot No. S8. The coil end winding end portion 187 is hung on a commutator segment No. C11 to end winding of the coil group (3)-1. In the coil W9 and the coil W10 of the coil group (3)-1, one winding conductor is continuously wound without being disconnected in the middle. The coil group (3)-1 consists of the coil W9 and the coil W10 in which one winding conductor is wound by means of the two-continuous winding.

In the coil group (3)-2, winding starts with the commutator segment No. C2. The coil end winding start portion 185 of the coil W11 serving as a component of the coil group (3)-2 is hung on the commutator segment No. C2, and the coil W11 is wound around a part ranging from the armature slot No. S2 to the armature slot No. S5. Subsequently, the inter-coil hairpin portion is hung on a commutator segment No. C8, and the coil W12 is wound around a part ranging from the armature slot No. S8 to an armature slot No. S11. The coil end winding end portion 187 is hung on the commutator segment No. C1 to end winding of the coil group (3)-2. In the coil W11 and the coil W12 of the coil group (3)-2, one winding conductor is continuously wound without being disconnected in the middle. The coil group (3)-1 consists of the coil W11 and the coil W12 in which one winding conductor is wound by means of the two-continuous winding.

Since the different coils share the equal slots housing the coil sides at the armature slots No. S2, No. S5, and No. S8, the coils constituting the third layer can be distributed and wound so as not to overlap with each other as illustrated in FIG. 4(c).

The third layer is provided with the plurality of armature coils W5 to W8 wound, at the equal slot pitch: 3 to that of the first to fourth armature coils W1 to W4, on the armature coils W5 to W8 wound in the lower layer (second layer).

Next, wire winding of the coil group (4)-1 in the fourth layer will be described with reference to FIGS. 3(d) and 4(d).

In the coil group (4)-1, winding starts with the commutator segment No. C11. The coil end winding start portion 185 of the coil W13 serving as a component of the coil group (4)-1 is hung on the commutator segment No. C11, and the coil W13 is wound around a part ranging from the armature slot No. S11 to the armature slot No. S1. The coil end winding end portion 187 is hung on the commutator segment No. C4 to end winding of the coil group (4)-1.

After winding is completed as above, the conductor retaining portions 184 are subject to welding, and electric connection between the coils 106 and the commutator segments 182 is established, to produce the armature 101.

In the present embodiment, the lowermost layer of coil end portions 106a is constituted by the two coil groups (1)-1 and (1)-2. The armature coils 106 of one coil group and the armature coils 106 of the other coil group are arranged alternately in the circumferential direction, and the four armature coils 106 included in the two coil groups are wound not to overlap with each other.

The coil groups (2)-1, (2)-2, (3)-1, and (3)-2 are wound in higher layers than the coil groups (1)-1 and (1)-2 constituting the lowermost layer and constitute the armature coils 106 in middle layers. Each middle layer consists of two coil groups. In each of the middle layers, the four armature coils 106 included in the two coil groups are wound at the equal slot pitch and coil pitch to those of the four armature coils 106 arranged in the lowermost layer. The coil pitch is set so that the four coils 106 may not overlap with each other.

Meanwhile, the wire winding order of the coil groups (1)-1 and (1)-2 may be switched. The same is true of the coil groups (2)-1 and (2)-2 and the coil groups (3)-1 and (3)-2.

The intent of the present invention is not to specify the winding order. The positions of the coils, the coil groups, and the commutator segments in the circumferential direction have only to be specified. The intent of the present invention is to avoid overlap of the coils at the coil end portions in each layer.

FIG. 5 describes wire winding of the armature 101 of the direct-current motor 200 according to the present embodiment viewed from a side of the commutator 102. A location at which a coil connecting wire 188 goes across the outer surface of the coil is only the coil connecting wire 188 of the coil 13 of the coil group (4)-1 connected from the armature slot No. S1 to the commutator segment No. C4 (location 183 marked with a dotted line circle). Thus, in a case in which the coils are subject to pressure forming with use of a jig to reduce the size of the coil ends, pressure forming except this location can reduce the size of the coil ends effectively without damaging the coil connecting wire 188. Meanwhile, the pressure forming may be performed in stages after winding in each layer.

Also, since the armature coils 106 are classified into the plurality of coil groups and are wound while each of the coil groups is connected to the conductor retaining portion 184 of the commutator segment 182, a plurality of double hooks (connecting portions in each of which two coil connecting wires 188 are hung on the conductor retaining portion 184) exist. Specifically, the double hooks are in seven locations in total of the commutator segments No. C11, No. C12, No. C13, No. C1, No. C2, No. C3, and No. C4. In this manner, in the present embodiment, an area in which the double hooks exist together (range of the commutator in the circumferential direction) and an area in which the conductor retaining portions 184 in each of which a middle portion of two coils included in one coil group is retained (single hooks) exist together (range of the commutator in the circumferential direction) are formed. That is, the single hooks and the double hooks are arrayed in the two separate areas.

As for conditions for a fusing treatment to be performed for electric connection between the coils 106 and the commutator segment 182, the fusing treatment should be performed while voltage of a welder and welding treatment time are appropriately adjusted for each of single connecting portions 161 and double connecting portions 162 to stabilize the connecting state since the single connecting portion 161 and the double connecting portion 162 have different numbers of winding conductors.

Also, wire winding is generally performed while a continuous conductor for coil winding is supplied from a wire winding bobbin. In the present embodiment, in the method for winding the plurality of coil groups, a switching operation between the coil groups needs to be performed as in the procedure of winding of the coil group, cutting of the winding conductor, and winding of the coil group. Cutting of the winding conductor may be performed by a tearing operation with use of a hook shape of the conductor retaining portion 184 or by means of a dedicated cutter. An appropriate cutting method may be selected.

FIG. 6 is an enlarged view of the coil connecting wires 188 and the conductor retaining portions 184. The conductor retaining portions 184 of the commutator segments 182 located at the center and the left side of the figure are the double connecting portions 162 while the conductor retaining portion 184 of the commutator segment 182 located at the right side is the single connecting portion 161. In the single connecting portion 161, the coil connecting wire 188 is hung on the hook-shaped conductor retaining portion 184 in an a shape, is subject to plastic forming at a part further on an inner circumferential side of the commutator than the hook shape, and is then subject to a welding treatment, to electrically connect the coil connecting wire 188 to the commutator segment 182.

Embodiment 2

Figure 7:
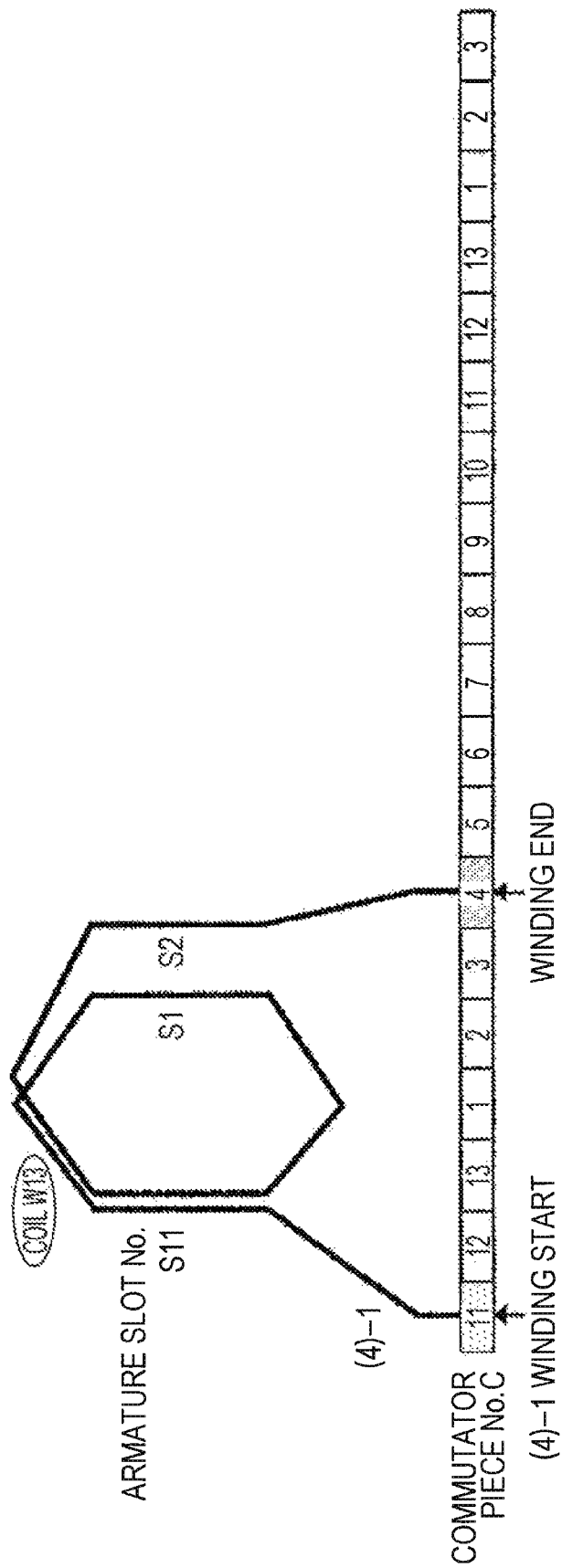
FIG. 7 describes a winding state (fourth layer) according to Embodiment 2 of the present invention.

Embodiment 2 of the present invention will be described with reference to FIG. 7. FIG. 7 describes a winding state in the fourth layer according to the present embodiment.

While, in Embodiment 1, the coil connecting wire 188 goes across the outer surface of the coil at one location, the present embodiment provides a winding method that can solve this problem. Only the coil 13 (coil group (4)-1) will be described, and description of wire winding of the other coil groups will be omitted since this is the same as that in Embodiment 1. As illustrated in FIG. 7, the coil end winding start portion 185 of the coil 13 serving as a component of the coil group (4)-1 is hung on the commutator segment No. C11, the coil 13 is wound around a part ranging from the armature slot No. S11 to the armature slot No. S1, only the last winding conductor of the coil 13 is wound through the armature slot No. S2, and the coil end winding end portion 187 is hung on the commutator segment No. C4. This can prevent the coil connecting wire 188 of the coil 13 connected to the commutator segment No. C4 from going across the outer surface of the coil. This can dispense with the coil connecting wire 188 going across the outer surface of the coil.

Embodiment 3

Figure 8A:
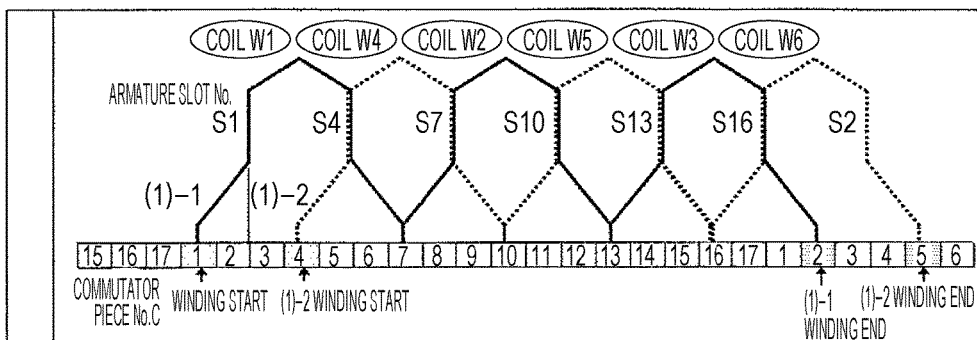
FIGS. 8A to 8C illustrate a winding state according to Embodiment 3 of the present invention.
Figure 8B:
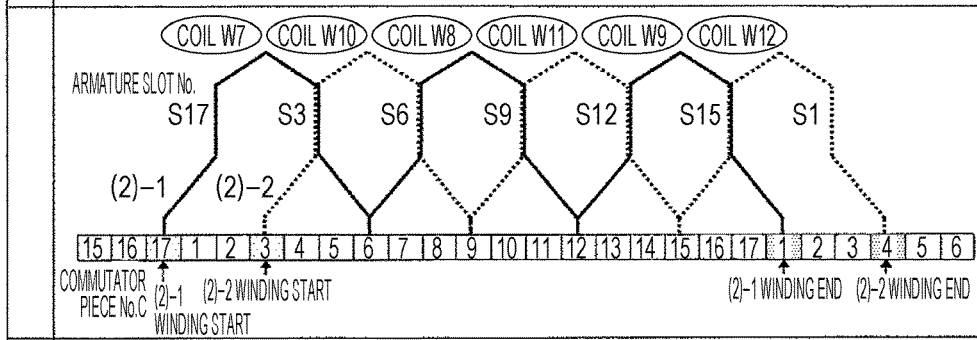
Figure 8C:
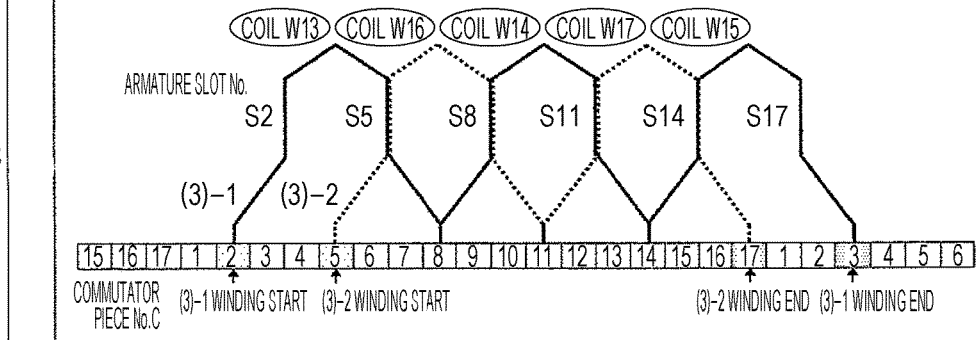
Figure 9A:
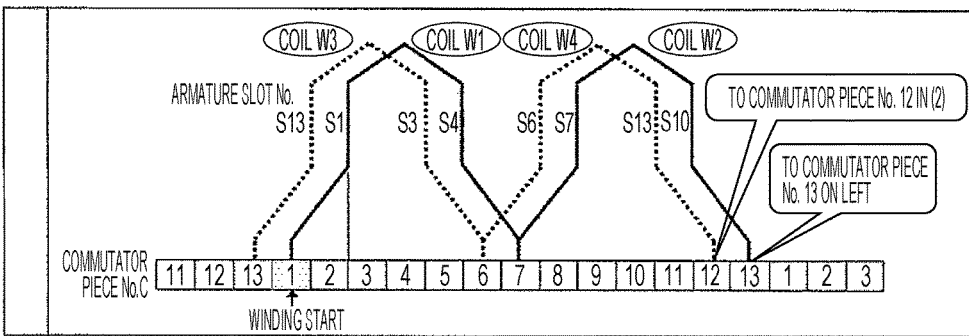
FIGS. 9A to 9D describe wire winding in a direct-current motor as a comparative example with the present invention.
Figure 9B:
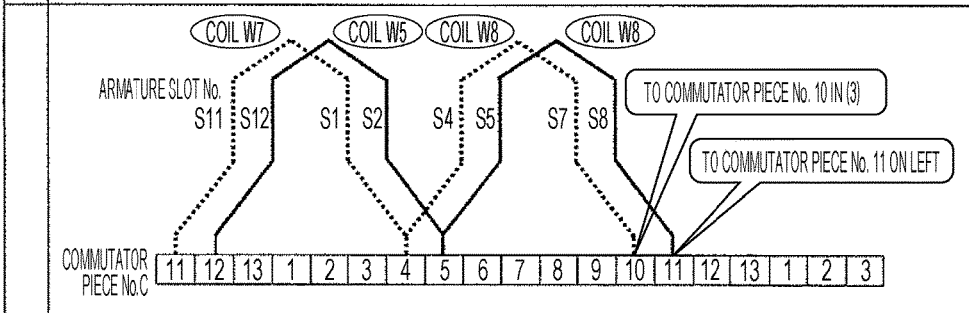
Figure 9C:
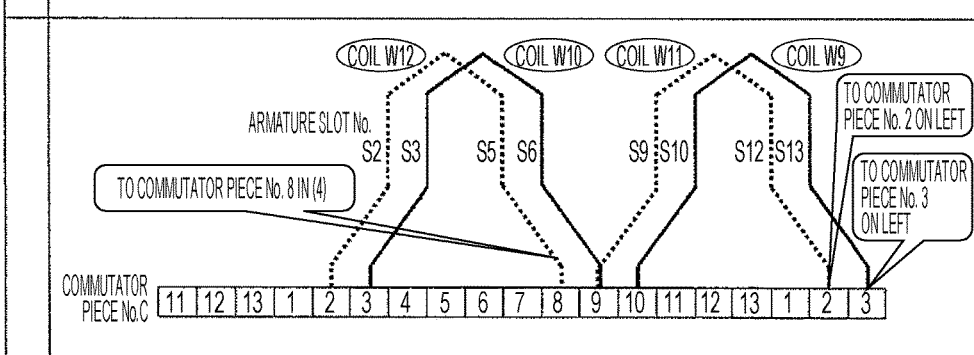
Figure 9D:
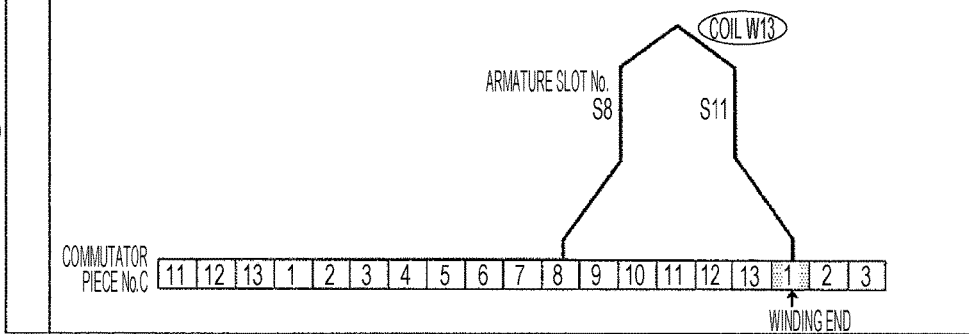

Embodiment 3 of the present invention will be described with reference to FIGS. 8(a) to 8(c). FIGS. 8(a) to 8(c) illustrate a winding state of progressive winding (close winding) of wave winding for a six-pole seventeen-slot armature according to the present embodiment.

There are two kinds of coil groups. There are six coil groups in total, consisting of five coil groups belonging to a first kind each including three coils which get the same number as the number of pole pairs P [Ns/P=17/3≈5.667, which becomes 5 after the value is cut off at the first decimal place] and one coil group belonging to a second kind including two coils [(P−1)=3−1=2], where Ns is the number of slots, and P is the number of pole pairs.

In the present embodiment, the coils are wound basically by means of three-continuous winding, and the two-continuous winding is partially employed. The three-continuous winding is applied to the coil groups constituting the respective layers from a lowermost layer to an uppermost layer, and in the uppermost layer, partial coil groups are wound by means of the three-continuous winding. The two-continuous winding is applied to partial coil groups constituting the uppermost layer.

Next, a specific wire winding process will be described. The number of coils is seventeen. A coil group (1)-1 consists of a coil W1, a coil W2, and a coil W3, a coil group (1)-2 consists of a coil W4, a coil W5, and a coil W6, a coil group (2)-1 consists of a coil W7, a coil W8, and a coil W9, a coil group (2)-2 consists of a coil W10, a coil W11, and a coil W12, a coil group (3)-1 consists of a coil W13, a coil W14, and a coil W15, and a coil group (3)-2 consists of a coil W16 and a coil W17.

Description will be provided in order of winding of the respective coils and coil groups. It is to be noted that FIGS. 8(a) to 8(c) illustrate a simplified winding state in which each coil 106 is wound through any of the armature slots 171 (S1 to S17) once, not a state in which each coil 106 is wound through any of the armature slots 171 plural times. Also, the coils and the coil groups are provided with numbers in accordance with the winding order, and the coils are wound in order of the coil W1, the coil W2, ..., and the coil W17, and the coil groups are wound in order of the coil group (1)-1, the coil group (1)-2, the coil group (2)-1, ..., and the coil group (3)-2.

As for FIGS. 8(a) to 8(c), FIG. 8(a) illustrates a winding wire connecting diagram of the coil group (1)-1 and the coil group (1)-2 constituting a first layer, FIG. 8(b) illustrates a winding wire connecting diagram of the coil group (2)-1 and the coil group (2)-2 constituting a second layer, and FIG. 8(c) illustrates a winding wire connecting diagram of the coil group (3)-1 and the coil group (3)-2 constituting a third layer.

First, a wire winding configuration of the coil group (1)-1 and the coil group (1)-2 in the first layer will be described with reference to FIG. 8(a). In the coil group (1)-1, winding starts with a commutator segment No. C1. The coil end winding start portion 185 of the coil W1 serving as a component of the coil group (1)-1 is hung on the commutator segment No. C1, and the coil W1 is wound around a part ranging from an armature slot No. S1 to an armature slot No. S4. Subsequently, the inter-coil hairpin portion is hung on a commutator segment No. C7, and the coil W2 is wound around a part ranging from an armature slot No. S7 to an armature slot No. S10. Subsequently, the inter-coil hairpin portion is hung on a commutator segment No. C13, and the coil W3 is wound around a part ranging from an armature slot No. S13 to an armature slot No. S16. The coil end winding end portion 187 is hung on a commutator segment No. C2 to end winding of the coil group (1)-1. In the coils W1 to W3 of the coil group (1)-1, one winding conductor is continuously wound without being disconnected in the middle. The coil group (1)-1 consists of the coils W1 to W3 in which one winding conductor is wound by means of the three-continuous winding.

In the coil group (1)-2, winding starts with a commutator segment No. 4. The coil end winding start portion 185 of the coil W4 serving as a component of the coil group (1)-2 is hung on the commutator segment No. C4, and the coil C4 is wound around a part ranging from the armature slot No. S4 to the armature slot No. S7. Subsequently, the inter-coil hairpin portion is hung on a commutator segment No. C10, and the coil W5 is wound around a part ranging from the armature slot No. S10 to the armature slot No. S13. Subsequently, the inter-coil hairpin portion is hung on a commutator segment No. C16, and the coil W6 is wound around a part ranging from the armature slot No. S16 to an armature slot No. S2. The coil end winding end portion 187 is hung on a commutator segment No. C5 to end winding of the coil group (1)-2. In the coils W4 to W6 of the coil group (1)-1, one winding conductor is continuously wound without being disconnected in the middle. The coil group (1)-1 consists of the coils W4 to W6 in which one winding conductor is wound by means of the three-continuous winding.

Since the different coils share the equal slots housing coil sides at the armature slots No. S4, No. S7, No. S10, No. S13, and No. S16, the coils W1 to W5 out of the coils W1 to W6 constituting the first layer can be distributed and wound so as not to overlap with each other. The coil W6 is wound to overlap with the coil W1 previously wound. That is, the coils W1 to W5 included in the first layer are wound on a lowermost layer without overlapping with the armature coils 106 wound through the different armature slots to constitute the first to fifth armature coils 106 (W1 to W5) sequentially arranged to be adjacent to each other. The first to fifth armature coils 106 (W1 to W5) have the coil sides adjacent to each other housed in the equal armature slots 171 (S4, S7, S10, S13, and S16).

Next, a wire winding configuration of the coil group (2)-1 and the coil group (2)-2 in the second layer will be described with reference to FIG. 8(b). In the coil group (2)-1, winding starts with a commutator segment No. C17. The coil end winding start portion 185 of the coil W7 serving as a component of the coil group (2)-1 is hung on the commutator segment No. C17, and the coil W7 is wound around a part ranging from an armature slot No. S17 to an armature slot No. S3. Subsequently, the inter-coil hairpin portion is hung on a commutator segment No. C6, and the coil W8 is wound around a part ranging from an armature slot No. S6 to an armature slot No. S9. Subsequently, the inter-coil hairpin portion is hung on a commutator segment No. C12, and the coil W9 is wound around a part ranging from an armature slot No. S12 to an armature slot No. S15. The coil end winding end portion 187 is hung on the commutator segment No. C1 to end winding of the coil group (2)-1. In the coils W7 to W9 of the coil group (2)-1, one winding conductor is continuously wound without being disconnected in the middle. The coil group (2)-1 consists of the coils W7 to W9 in which one winding conductor is wound by means of the three-continuous winding.

In the coil group (2)-2, winding starts with a commutator segment No. C3. The coil end winding start portion 185 of the coil W10 serving as a component of the coil group (2)-2 is hung on the commutator segment No. C3, and the coil W10 is wound around a part ranging from the armature slot No. S3 to the armature slot No. S6. Subsequently, the inter-coil hairpin portion is hung on a commutator segment No. C9, and the coil W11 is wound around a part ranging from the armature slot No. S9 to an armature slot No. S12. Subsequently, the inter-coil hairpin portion is hung on a commutator segment No. C15, and the coil W12 is wound around a part ranging from the armature slot No. S15 to the armature slot No. S1. The coil end winding end portion 187 is hung on the commutator segment No. C4 to end winding of the coil group (2)-2. In the coils W10 to W12 of the coil group (2)-2, one winding conductor is continuously wound without being disconnected in the middle. The coil group (2)-2 consists of the coils W10 to W12 in which one winding conductor is wound by means of the three-continuous winding.

Since the different coils share the equal slots housing the coil sides at the armature slots No. S3, No. S6, No. S9, No. S12, and No. S15, the coils W7 to W11 out of the coils W7 to W12 constituting the second layer can be distributed and wound so as not to overlap with each other.

The second layer is provided with the plurality of armature coils W7 to W12 wound, at the equal slot pitch: 3 to that of the first to sixth armature coils W1 to W6, on the armature coils W1 to W6 wound in the lowermost layer (first layer).

Next, a wire winding configuration of the coil group (3)-1 and the coil group (3)-2 in the third layer will be described with reference to FIG. 8(c). In the coil group (3)-1, winding starts with the commutator segment No. C2. The coil end winding start portion 185 of the coil W13 serving as a component of the coil group (3)-1 is hung on the commutator segment No. C2, and the coil W13 is wound around a part ranging from the armature slot No. S2 to an armature slot No. S5. Subsequently, the inter-coil hairpin portion is hung on a commutator segment No. C8, and the coil W14 is wound around a part ranging from an armature slot No. S8 to an armature slot No. S11. Subsequently, the inter-coil hairpin portion is hung on a commutator segment No. S14, and the coil W15 is wound around a part ranging from an armature slot No. S14 to the armature slot No. S17. The coil end winding end portion 187 is hung on the commutator segment No. C3 to end winding of the coil group (3)-1. In the coils W13 to W15 of the coil group (3)-1, one winding conductor is continuously wound without being disconnected in the middle. The coil group (3)-1 consists of the coils W13 to W15 in which one winding conductor is wound by means of the three-continuous winding.

In the coil group (3)-2, winding starts with the commutator segment No. C5. The coil end winding start portion 185 of the coil W16 serving as a component of the coil group (3)-2 is hung on the commutator segment No. C5, and the coil W16 is wound around a part ranging from the armature slot No. S5 to the armature slot No. S8. Subsequently, the inter-coil hairpin portion is hung on a commutator segment No. C11, and the coil W17 is wound around a part ranging from the armature slot No. S11 to the armature slot No. S14. The coil end winding end portion 187 is hung on the commutator segment No. C17 to end winding of the coil group (3)-2. In the coil W16 and the coil W17 of the coil group (3)-2, one winding conductor is continuously wound without being disconnected in the middle. The coil group (3)-1 consists of the coil W16 and the coil W17 in which one winding conductor is wound by means of the two-continuous winding.

Since the different coils share the equal slots housing the coil sides at the armature slots No. S5, No. S8, No. S11, and No. S14, the coils W13 to W17 constituting the third layer can be distributed and wound so as not to overlap with each other.

The third layer is provided with the plurality of armature coils W13 to W17 wound, at the equal slot pitch: 3 to that of the first to sixth armature coils W1 to W6, on the armature coils W7 to W12 wound in the lower layer (second layer).

In the present embodiment, the commutator segment which is the double hook, in which two independent coil connecting wires are connected, is located at six locations, in total, of No. C1 to C5 and C17, and the commutator segment which is the single hook is located at eleven locations, in total, of No. C6 to C16. In this manner, in the present embodiment, an area in which the double hooks exist together (range of the commutator in the circumferential direction) and an area in which the single hooks exist together (range of the commutator in the circumferential direction) are formed. That is, the single hooks and the double hooks are arrayed in the two separate areas.

After winding is completed, the conductor retaining portions 184 are subject to welding, and electric connection between the coils 106 and the commutator segments 182 is established, to produce the armature 101.

In the present embodiment, the lowermost layer of coil end portions 106a is constituted by the two coil groups (1)-1 and (1)-2. The armature coils 106 of one coil group and the armature coils 106 of the other coil group are arranged alternately in the circumferential direction, and the six armature coils 106 included in the two coil groups are wound not to overlap with each other.

The coil groups (2)-1 and (2)-2 are wound in a higher layer than the coil groups (1)-1 and (1)-2 constituting the lowermost layer and constitute the armature coils 106 in a middle layer. The middle layer consists of two coil groups. In the middle layer, the six armature coils 106 included in the two coil groups are wound at the equal slot pitch and coil pitch to those of the six armature coils 106 arranged in the lowermost layer. The coil pitch is set so that the six coils 106 may not overlap with each other.

In Embodiment 1, Embodiment 2, and Embodiment 3, the coils 106 are wound so that the coils may not overlap at the coil end portions 106a, or so that one location at which the coils overlap may exist, in every layer. Avoiding the coil overlapping part does not need to be intended for all layers. By avoiding the coil overlapping part at least in one layer, the overlap at each coil end portion can be simple, which brings about an effect of restricting deformation of the coils at the time of coil winding.

The present invention is preferably applied to a motor whose number of poles of a field magnet is four or more (number of pole pairs: two or more).

As illustrated in FIGS. 5 and 10, there exists the coil 106 wound to be interposed between the two coils 106 wound around one tooth to intersect with each other. In FIG. 5, the coils W5, W7, W6, W8, and W9 at teeth T1, T4, T7, T10, and T13 are the coils 106 each wound to be interposed between the two coils 106. On the other hand, in FIG. 10, the coils W3, W10, W8, W6, W4, W11, W9, W7, and W5 at teeth T1, T4, T5, T6, T7, T10, T11, T12, and T13 are the coils 106 each wound to be interposed between the two coils 106. Such a coil 106 easily suffers winding deformation since the coil 106 is wound on the coil 106 in the lower layer and receives a force from the coil 106 wound in the upper layer under tension. The number of such locations easily suffering winding deformation is as many as nine in FIG. 10 while the number is five in FIG. 5. Accordingly, according to each of the above embodiments, since the coils 106 can be wound while reducing the number of locations easily suffering winding deformation, each of the above embodiments is advantageous in forming the coil end portions 106a to be compact.

It is to be understood that each of the embodiments of the present invention can be applied to any direct-current motor including armature coils 106 wound in the wave winding method regardless of the number of poles and the number of slots described above, and that such a direct-current motor to which each of the embodiments of the present invention has been applied exerts the effect.

In general, the winding method in FIG. 10 is referred to as the wave winding. Strictly speaking, the winding method in each of the embodiments of the present invention is different from the wave winding. However, the winding method in each of the embodiments is a winding method to achieve a winding formation that is operated in a similar manner to a winding formation generally referred to as the wave winding. Thus, the winding method in each of the embodiments is referred to as the wave winding as a kind of the wave winding.

Each of the above embodiments exerts an effect of reducing the number of inter-coil overlaps at the coil end portions 106a of the armature coils, enabling a coil end height to be set to be low, and enabling size reduction of the motor. Also, since the coil connecting wires are arranged on inner sides of the coils, each of the above embodiments exerts an effect of restricting contact with other parts and vibration and providing the highly-reliable motor.

The number of the coil connecting wires going across the outer surfaces of the coil end portions can be low, and the coil end portions can be formed to be compact. Size reduction of the car electric component motor can be achieved, and mounting capability thereof can be improved. Further, possibility that the coil connecting wires contact with other parts or are in friction due to vibration can be reduced, disconnection and an insulation failure of the coil connecting wires can be prevented, and high reliability can be obtained.

The present invention is not limited to the foregoing embodiments and includes various modification examples. For example, the foregoing embodiments have been described in detail to facilitate understanding of the present invention, and the present invention is not limited to one including all of the components described herein. Also, some components of one embodiment can be substituted with components of another embodiment, and components of another embodiment can be added to components of one embodiment. Further, some components of each embodiment can be added, deleted, and substituted with other components.

REFERENCE SIGNS LIST 101 armature
102 commutator
103 front bracket
104 yoke
105 field magnet
106 armature coil
110 shaft
115 brush
120 front bearing
121 rear bearing
130 brush holder
131 brush pressurizing spring
150 armature core
161 single connecting portion
162 double connecting portion
171 armature slot
172 armature tooth
181 coil group
182 commutator segment
183 location at which coil connecting wire goes across outer surface of coil
184 conductor retaining portion
185 coil end winding start portion
186 inter-coil hairpin portion
187 coil end winding end portion
188 coil connecting wire
200 direct-current motor

The invention claimed is:

1. A direct-current motor including an armature including a plurality of armature slots and an armature coil wound to stride over two of the armature slots away from each other with a certain number of the armature slots interposed therebetween, the direct-current motor comprising:

at least four armature coils each wound on a lowermost layer of a coil end portion without overlapping with the armature coil wound through the different armature slots, wherein, on a higher layer than the four armature coils wound on the lowermost layer, at least four armature coils wound in an equal pattern to that of the four armature coils are provided wherein the four armature coils wound on the lowermost layer have coil sides thereof adjacent to each other housed in the respective equal armature slots, and the four armature coils wound on the higher layer than the lowermost layer have coil sides thereof adjacent to each other housed in the respective equal armature slots, wherein the armature coils constitute a plurality of coil groups each including coils which get an equal number to the number of pole pairs P, each of the coil groups being wound by one continuous winding conductor, and a coil group including (P−1) coils, wherein a part between two coils wound by one continuous winding conductor is retained in a conductor retaining portion of a commutator segment in a state in which the two coils are continuous, and wherein each end portion of each of the coil groups is cut in a state of being retained in a conductor retaining portion of a different commutator segment from the commutator segment.

2. The direct-current motor according to claim 1, wherein the number of the coil groups each including the P coils corresponds to a natural number obtained by cutting off at a first decimal place a value obtained by dividing the number of slots Ns by the number of pole pairs P, and the number of the coil groups including the (P−1) coils is one.

3. The direct-current motor according to claim 2, wherein a commutator includes a plurality of conductor retaining portions in each of which two independent winding conductors are retained as each end portion of each of the coil groups is retained in each of the conductor retaining portions, and a plurality of conductor retaining portions in each of which one winding conductor is retained as a part between two coils wound by one continuous winding conductor is retained in each of the conductor retaining portions in a state in which the two coils are continuous, and wherein the plurality of conductor retaining portions in each of which two winding conductors are retained and the plurality of conductor retaining portions in each of which one winding conductor is retained are arrayed in two separate areas in a circumferential direction of the commutator.

4. The direct-current motor according to claim 3, wherein the number of poles of a field magnet is four or more.

5. The direct-current motor according to claim 4, wherein the number of the coil groups is four or more.

6. The direct-current motor according to claim 3, wherein the number of poles of a field magnet is four, and the number of slots is thirteen.

7. The direct-current motor according to claim 3, wherein the number of the coil groups is four or more, the number of poles of a field magnet is six, and the number of slots is seventeen.

* * * * *